Patented Feb. 1, 1938

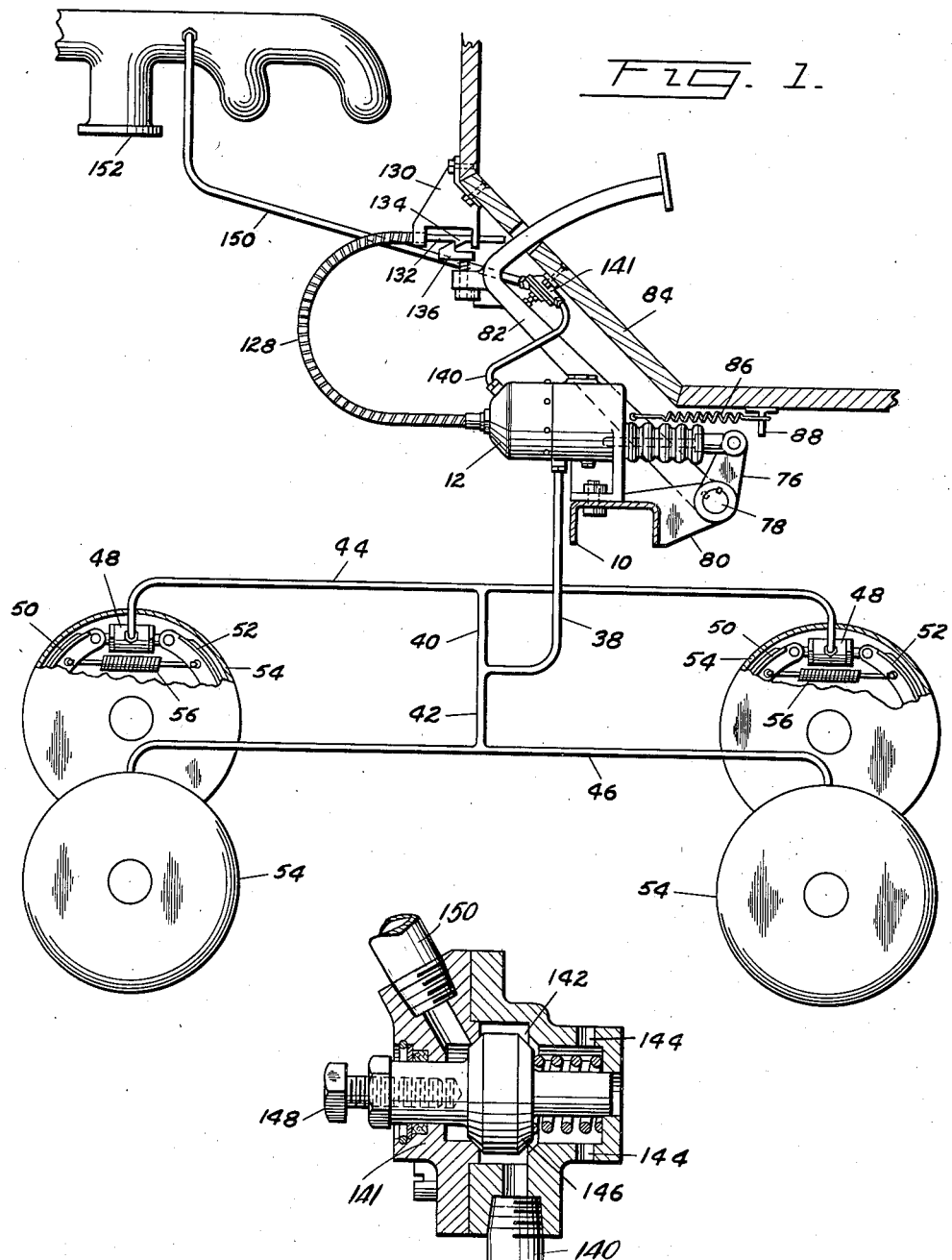

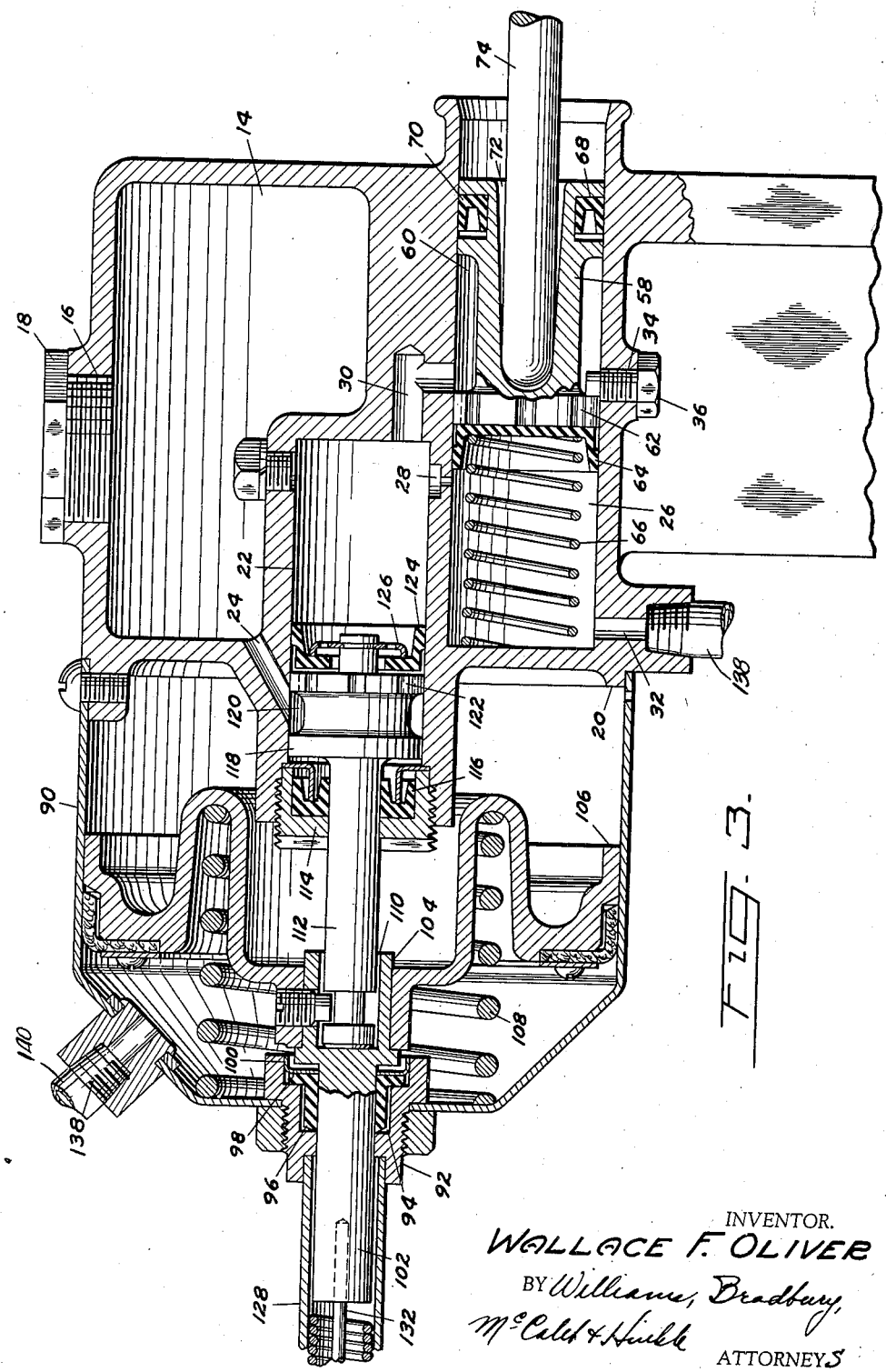

2,106,757

UNITED STATES PATENT OFFICE 2,106,757

HYDRAULIC BRAKE SYSTEM

Wallace F. Oliver, Detroit, Mich., assignor to Hydraulic Brake Company, Detroit, Mich., a corporation of California Application February 28, 1934, Serial No. 713,258

9 Claims. (Cl. 188—152)

This invention relates to hydraulic brake systems for motor vehicles.

An object of the invention is to provide a hydraulic brake system including means for taking up slack in the system.

Another object of the invention is to provide a hydraulic brake system including means for creating an initial pressure in the system for moving the friction elements of the brake into drum engagement.

A further object of the invention is to provide a hydraulic brake system including means for actuating a plurality of brakes wherein of the total effect exerted at the brakes a portion derived from stored energy released upon initial application of the brakes does not exceed a predetermined maximum, while the remaining portion of the total effect at the brakes is dependent upon and varies with the manually applied pressure for operating the brakes. In a normal operation of the brakes an initial pressure is derived from the release of the stored-up energy without material effort, whereas in the effective application of the brakes the greater part of the effect at the brakes will be derived from manually applied pressure.

Other objects of the invention will appear from the following description taken in connection with the drawings which form a part of this specification, and in which,—

Figure 1 is a diagrammatical illustration of a motor vehicle equipped with a hydraulic brake system embodying the invention;

Figure 2 is an enlarged detail view of a valve structure, and

Figure 3 is an enlarged view of a compression device.

Referring to the drawings for more specific details of the invention, 10 represents a cross-member of a motor vehicle chassis frame. The cross-member has secured thereon a compression device 12 including a reservoir 14 having a filling opening 16 closed as by a plug 18, and formed on one side of the reservoir is an annular shoulder 20.

In the bottom of the reservoir, concentrically disposed to the annular shoulder 20, is a cylinder 22 having a port 24 providing a communication between the cylinder and the reservoir, and arranged below the cylinder 22 is a cylinder 26 having ports 28 and 30 providing communications between the cylinders 22 and 26 and a discharge port 32. The cylinder 26 also has a drain opening 34 closed as by a plug 36, the inner end of which extends into the cylinder, the purpose of which will hereinafter appear.

The discharge port 32 of the cylinder 26 has connected thereto a conduit 38 communicating with branch conduits 40 and 42, which communicate respectively with conduits 44 and 46 having their respective ends connected to expansible elements or motor cylinders 48 of conventional type. The motor cylinders 48 are connected between the separable ends of friction elements 50 and 52, arranged for cooperation with rotatable drums 54, which may be suitably secured to the wheels of a vehicle, and the respective pairs of friction elements 50 and 52 are connected by retractable springs 56.

The cylinder 26 has therein a piston 58. As shown, the body of this piston is reduced in cross-section to provide an annular chamber 60 between the piston and the wall of the cylinder. This chamber communicates with the cylinder 22 by way of the port 30, and the head of the piston 58 has a plurality of openings 62 providing communications between the chamber 60 and that portion of the cylinder chamber forward of the head of the piston 58, and positioned on the head of the piston is a collapsible leak-proof cup 64 held against displacement by a spring 66 interposed between the cup 64 and the head of the cylinder. The spring 66 also serves to return the piston to its retracted position, in which position the piston is seated on the plug 36.

The skirt of the piston 58 has a circumferential groove 68 in which is seated a leak-proof washer 70, and formed in the back of the piston is a recess 72 receiving the free end of a thrust rod 74, the other end of which is pivotally connected to an arm 76 keyed on a shaft 78 journaled in a bracket 80 on the cross-member 10, and suitably secured to the shaft is a foot pedal lever 82 extending through an opening in a foot-board 84 of the body of the vehicle. The foot pedal lever is returned to its retracted or normal position by a retractor spring 86 connecting the pedal to a fixed support 88.

Suitably secured on the annular shoulder 20 is a cylinder 90, the head of which is provided with an opening arranged concentrically to the cylinder 22, and fitted in this opening is a sleeve 92 including a packing chamber 94 having therein a rubber bushing 96, secured in place by an annular washer 98 provided with a circumferential flange 100 fitted snugly in the chamber.

A rod 102 reciprocable in the sleeve 92 has an enlarged end 104 on which is secured a piston 106 fitted in the cylinder 90, and interposed between this piston and the head of the cylinder 90 is a compression spring 108. The enlarged portion 104 on the rod 102 has a bore 110 in which is secured a piston rod 112. The piston rod extends through a packing box 114 threaded in the cylinder 22 and provided with a leak-proof cup 116, suitably secured against displacement, and formed on the rod 112 is a piston 118 fitted in the cylinder 22.

The body portion of the piston 118 is reduced in cross-section to provide a chamber 120 communicating by way of the port 24 with the reservoir 14, and the head of the piston has a plurality of ports 122 providing communications between the chamber 120 and that portion of the cylinder chamber forward of the piston 118. The head of the piston 118 has thereon a collapsible leak-proof cup 124 suitably secured against displacement by a washer 126 secured to a post formed on the piston.

The sleeve 92 has secured thereto one end of a flexible tubular casing 128, the other end of which is secured to a bracket 130 attached to the foot board 84, and a wire 132 in the casing has one end secured to the rod 102 and its other end supported on the bracket 130 and provided with a catch 134 cooperating with a spring-pressed latch 136 on the pedal 82.

The cylinder 90 has a port 138 connected by a conduit 140 to a valve 141 having a chamber 142 vented as at 144, and a spring-pressed valve 146 in the chamber 142 has an adjustable stud 148 normally engaged by the foot pedal lever 82 to retain the valve in open position when the foot pedal lever is in normal position, and a conduit 150 connects the valve chamber 142 to an intake manifold 152 of the prime mover of the vehicle.

In operation, assuming that the system is filled with suitable fluid, upon the initial movement of the foot pedal lever 82 tending to apply the brakes, the catch 136 on the lever releases the latch 134 of the Bowden mechanism or wire 132, and, simultaneously therewith, this movement of the lever releases the valve 146 and the valve is urged to its seat, resulting in opening the cylinder 90 to atmosphere.

Upon release of the Bowden mechanism or wire 132 and the valve 146, the spring 108 actuates the piston 106, and this movement of the piston 106 is transmitted to the piston 118 resulting in discharging the fluid in the cylinder 22 through ports 28 and 30, past the collapsible cup 64, into cylinder 26, and through the cylinder 26 and discharge port 32 and conduits connected thereto into the expansible elements or motor cylinder 48, resulting in spreading the friction elements 50 and 52 to take up any clearance between the friction elements and the drums 54.

During this movement of the piston 118, the arm 76 on the shaft 78 is rocked through an angle by the foot pedal lever 82, and this movement of the arm 76 is transmitted to the rod 74 to take up any slack between the foot pedal lever and the piston 58 and to apply force to the piston 58.

Upon further movement of the foot pedal lever to apply the brakes, the piston 58 is moved on its compression stroke resulting in closing the port 28 and discharging the fluid in the cylinder 58 through the discharge port 32 and the conduits and branch conduits connected thereto into the expansible elements or motor cylinders 48, resulting in spreading the friction elements 50 and 52 into engagement with the drums for effective braking action.

Upon release of the foot pedal lever 82, the retractor spring 86 returns the foot pedal lever to its normal position. During this movement of the foot pedal lever the valve 146 is moved to open position. Upon opening the valve 146, the cylinder 90 is closed to atmosphere and connected to the manifold 152 of the prime mover, resulting in evacuation of the cylinder 90.

As the cylinder 90 is evacuated, the piston 106 is retracted, and compresses the spring 108, and since the piston 106 carries with it the piston 118, the piston 118 is also retracted. As the piston 118 moves to its retracted position the Bowden wire 132 moves with the piston and slides in the housing 128. The upper end of the wire is attached to the catch 134, and at the time the piston starts to return, the catch 134 is disengaged from the latch 136 and is to the left of the position shown in Figure 1. As the piston 118 returns and the Bowden wire 132 moves with it, the catch 134 moves to the right as viewed in Figure 1, and as it so moves it slides over the inclined left-hand end of the catch 136, thereby depressing it until the catch 134 moves past the upwardly projecting finger of the latch 136, whereupon the latch 136 is moved upwardly by its spring and the finger of the latch 136 engages the downwardly projecting finger of the catch 134. The purpose of this mechanism is to prevent movement of the piston 118 when the prime mover is idle.

As the piston 118 moves to its retracted position, the collapsible cup 124 moves from its seat on the piston 118 and opens the ports 122, resulting in relieving pressure in the cylinder 22 and establishing a free circulation for the fluid between the reservoir and the cylinder 22. When the foot pedal lever moves to its retracted or normal position, the applied force on the piston 58 is released with the result that this piston is moved to its retracted position by the fluid returning from the expansible elements or motor cylinders 48, due to pressure imposed by the retractor springs 56 connected between the friction elements of the respective brake structures, and this movement of the piston 58 is augmented by the spring 66.

Due to friction on the column of fluid in the cylinder 26 and the conduits connecting this cylinder to the expansible elements or motor cylinders 48, and to the tension of the springs 66, the piston 58 returns to its retracted position slightly in advance of the return of the fluid to the cylinder 26. This causes a partial vacuum in the cylinder 26, resulting in collapse of the cup 64 and admission of fluid from the cylinder 22 supplied from the reservoir through port 24.

Upon complete return of the piston 58 to its retracted position, the port 28 is uncovered, whereupon further pressure in the cylinder 26 causes the cup 64 to return to its normal or static condition, and any excess fluid returned to the cylinder 26 from the expansible elements or motor cylinders 48 passes from the cylinder 26 through the port 28 to the cylinder 22, and from thence through port 24 to the reservoir.

Although this invention has been described in connection with certain specific embodiments, the principles involved are susceptible of numerous other applications that may readily occur to persons skilled in the art. The invention is, therefore, to be limited only as indicated by the scope of the appended claims.

Having thus described the various features of the invention, what I claim as new and desire to secure by Letters Patent is:

1. A hydraulic brake system comprising a primary means for producing pressure in the system, a secondary means for producing pressure connected to the system through the primary means, a source of a predetermined quantity of stored energy for actuating the secondary means, said predetermined quantity being just sufficient to remove slack from the system, means for releasing the stored energy, and means for actuating the primary means including means controlling the release means.

2. A hydraulic brake system comprising a primary means for producing pressure in the system, a secondary means for producing pressure connected to the system through the primary means, a source of a predetermined quantity of energy for actuating the secondary means, said predetermined quantity being just sufficient to remove slack from the system, control means for the stored energy, and means for actuating the primary means including means for releasing the control means.

3. A hydraulic brake system comprising a primary means for producing pressure, an expansible element connected thereto, a brake element operated by the expansible element, a secondary means for producing pressure connected to the expansible element, a source of a predetermined quantity of stored energy for actuating the secondary means, said predetermined quantity being just sufficient to remove slack from the system, means for restraining the stored energy, and means for actuating the primary means including means for releasing the restraining means.

4. A hydraulic brake system comprising a primary means for producing pressure, an expansible element connected thereto, a brake element operated by the expansible element, a secondary means for producing pressure connected to the expansible means, a compression member for actuating the secondary means, compression means for the member, means for retaining the member under compression, and means for actuating the primary means including means controlling the restraining means.

5. A hydraulic brake system comprising a primary means for producing a pressure, an expansible element connected thereto, a brake element operated by the expansible element, a secondary means for producing pressure connected to the expansible element, expansible means for actuating the secondary means, vacuum means for compressing the expansible means, means for retaining the expansible means under compression, and means for actuating the primary means including means controlling the retaining means.

6. A hydraulic brake system comprising a compression device including a reservoir, a cylinder having a port providing communication between the reservoir and the cylinder, a piston reciprocable in the cylinder, a vacuum chamber, a spring-pressed plunger therein connected to the piston in the cylinder, a second cylinder having ports providing communications between the cylinders, and a piston reciprocable in the second cylinder.

7. A hydraulic brake system comprising a compression device including a reservoir, a cylinder having a port providing a communication between the reservoir and the cylinder, a piston reciprocable therein, a collapsible leak-proof cup on the head of the piston, a vacuum chamber associated with the cylinder, a spring-pressed piston in the vacuum chamber connected to the piston in the cylinder, a second cylinder associated with the first-mentioned cylinder having ports providing communications between the cylinders, a piston reciprocable in the second cylinder, a collapsible leak-proof cup on the head of the piston in the second cylinder, and means for actuating the piston in the second cylinder.

8. A hydraulic brake system for motor vehicles having an internal combustion engine comprising a primary means for producing pressure, an expansible element connected thereto, a brake element operated by the expansible element, a secondary means for producing pressure connected to the expansible element, a vacuum chamber, a spring-pressed piston therein connected to the secondary means, a conduit connecting the vacuum chamber to the intake manifold of the engine, means restraining movement of the piston in the vacuum chamber, and means for actuating the primary means including means controlling the restraining means.

9. A hydraulic brake system for a motor vehicle having an internal combustion engine comprising a primary means for producing pressure, an expansible element connected thereto, a brake element operated by the expansible element, a secondary means for producing pressure connected to the expansible element through the primary means, a vacuum chamber, a spring-pressed piston in the chamber connected to the secondary means, a conduit connecting the vacuum chamber to the intake manifold of the engine, a valve connected in the conduit, restraining means for the piston in the vacuum chamber, and means for actuating the primary means including means cooperating with the restraining means to release the piston in the vacuum chamber upon initial movement of the actuating means for the primary means.

WALLACE F. OLIVER.